Figure 1:
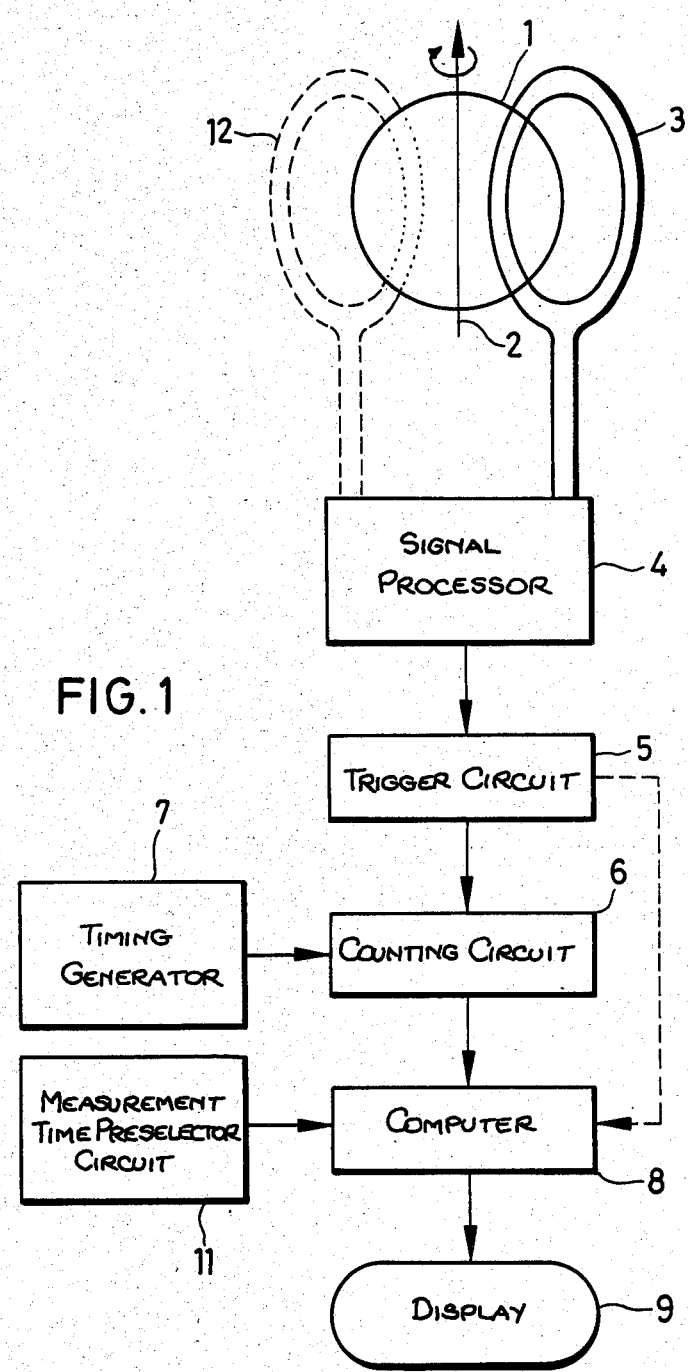

United States Patent [19]

Schmidt

[11] Patent Number: 4,640,136

[45] Date of Patent: Feb. 3, 1987

[54] METHOD FOR THE PROCESSING OF MEASUREMENT DATA IN A GAS FRICTION VACUUM METER AND A GAS FRICTION VACUUM METER EQUIPPED WITH A CIRCUIT FOR THE PRACTICE OF THIS METHOD

[75] Inventor: Lothar Schmidt, Kerpen-Sindorf, Fed. Rep. of Germany

[73] Assignee: Leybold-Heraeus GmbH, Cologne, Fed. Rep. of Germany

[21] Appl. No.: 680,378

[22] Filed: Dec. 11, 1984

[30] Foreign Application Priority Data

Dec. 17, 1983 [EP] European Pat. Off. ........ 83112728.7

[51] Int. Cl.$^4$ .............................................. G01L 9/00
[52] U.S. Cl. ..................................................... 73/753
[58] Field of Search ................................... 73/700, 753

[56] References Cited

PUBLICATIONS

Reich, Vakuum-Technik, vol. 31, No. 6, 6-1982, pp. 172-178.

*Primary Examiner*—Donald O. Woodiel
*Attorney, Agent, or Firm*—Felfe & Lynch

[57] ABSTRACT

A method for the processing of values measured in a gas friction vacuum meter, in which the pressure is determined by the drag on a magnetically suspended free ball, by forming a first time value $t_{n-1}$ by measuring the time required for N/2 periods of revolution of the ball, and a second time value $t_n$ by the immediately following measurement of the time required for another N/2 periods of revolution of the ball, determining a pressure value by comparing the two times values, repeating this pressure value determination of two time values after each period of rotation for the same number N of periods of rotation of the ball to a total of z determinations, and displaying the average of the pressure value determined Z times. To be able to determine the pressure with optimum measurement times and uncertainties of measurement, the ratio of N to Z is selected at approximately 4:1.

6 Claims, 2 Drawing Figures

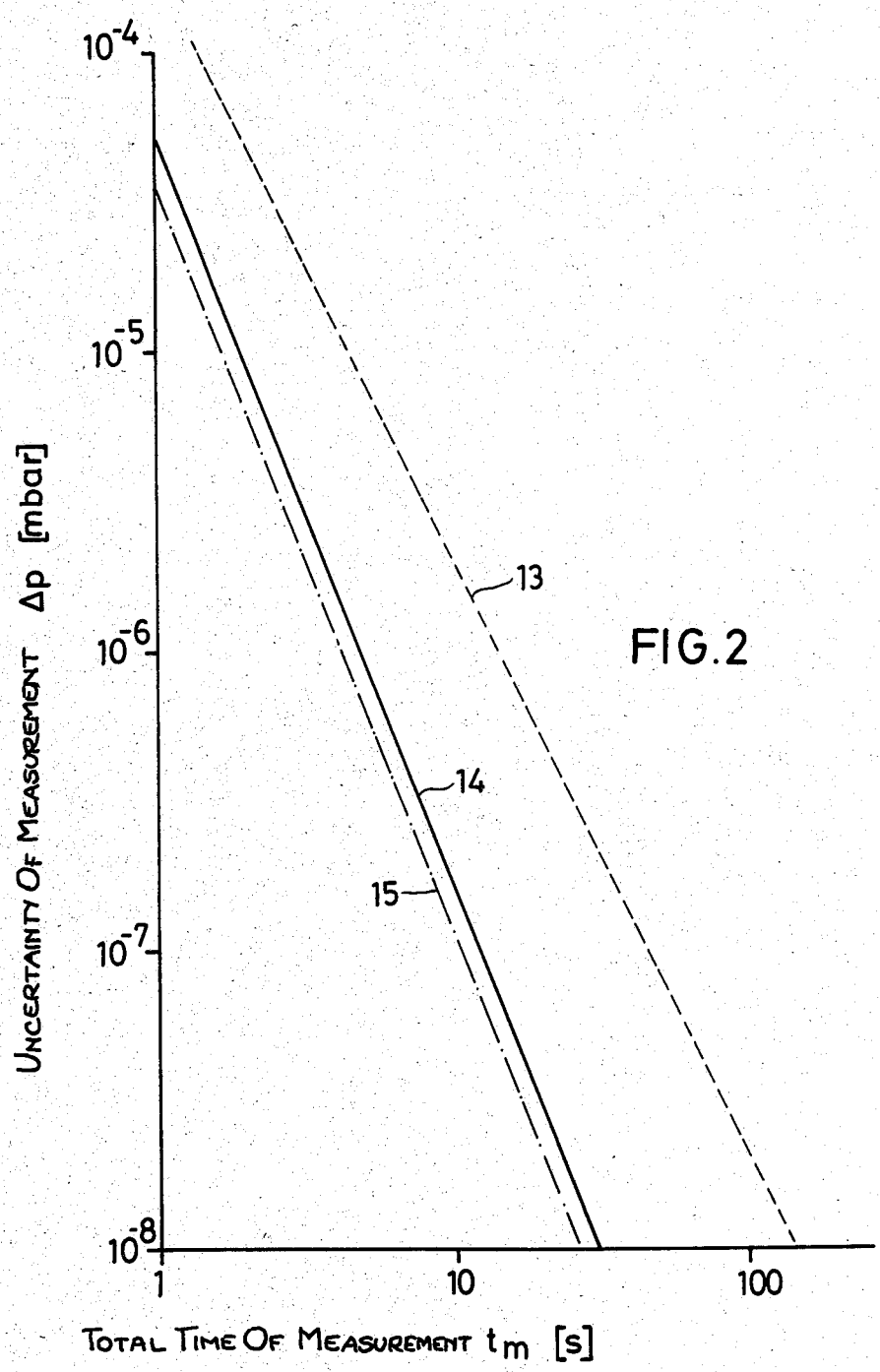

METHOD FOR THE PROCESSING OF MEASUREMENT DATA IN A GAS FRICTION VACUUM METER AND A GAS FRICTION VACUUM METER EQUIPPED WITH A CIRCUIT FOR THE PRACTICE OF THIS METHOD

This invention relates to a method for the processing of measurement data in a gas friction vacuum meter, in which the pressure level is determined through the drag exerted on a magnetically suspended free ball, by forming a first time value $t_{n-1}$ by measuring the time required for N/2 periods of revolution of the ball and a second time value $t_n$ by the immediately following measurement of the time of additional N/2 periods of revolution of the ball, a pressure is determined by comparing the two time values, this pressure determination from two time values is repeated after each period of rotation for the same number of N periods of rotation of the ball to a total of Z determinations, and the average of the pressure determined Z times is displayed. The invention moreover relates to a gas friction vacuum meter equipped with a circuit means for the practice of this method.

It is known to determine the drag exerted on a magnetically suspended free ball by a gas, and on that basis to determine the gas pressure (cf. Vakuumtechnik, vol. 31, No. 6, 1982, pp. 172 ff.). In the apparatus described, the ball is brought to a rotational speed of 400 Hz, and then the drive is shut off and the slowing of the ball is determined on a time basis. In principle, would be possible to determine the time required for two directly successive ball revolutions and determine the pressure from the time difference. Such a process, however, would entail a great deal of uncertainty on account of the extremely small time differences involved.

It is more advantageous to measure successively the times $t_{n-1}$ and $t_n$ which the ball requires for a given number of rotations so as to be able to determine the rotation times more precisely by averaging. The pressure p can be determined from the time measurements according to the following formula:

$$p = C \times \frac{t_n - t_{n-1}}{t_n \times t_{n-1}}$$

C is a constant which depends on the physical properties of the ball and can easily be determined. $t_{n-1}$ and $t_n$ are the time which the ball requires for a given number of rotations.

In this method of measurement there will then be a sufficiently low uncertainty of measurement if the number of revolutions is made sufficiently large.

It is therefore a disadvantage of this kind of measurement data processing that it takes a relatively long time to display a pressure value with a low uncertainty of measurement, especially if a plurality of pressures are to be measured in succession. The result in practice, therefore, is measurement times with acceptable uncertainty of as long as 30 seconds. An apparatus operating in this manner therefore never displays the actual pressure that prevails in a system under surveillance.

It is furthermore known to divide the times $t_{n-1}$ and $t_n$ into N/2 periods each, with a period duration $\tau$, and to begin another time measurement (which is to be determined by one or more preceding measurements) after the time of one period $\tau$ without first waiting until the end of the times $t_{n-1}$ and $t_n$ of the preceding time measurement. The first value of such a measurement is then available after a total measurement time:

$$t_m = N \times \tau + (Z-1) \times \tau$$

wherein:

N = total number of periods $\tau$ which are used in order to form the two time values $t_{n-1}$ and $t_n$. $\tau$ = period duration, i.e., the time required for a set number of revolutions of the ball, and Z = number of time measurements repeated after one period $\tau$ of revolution of the ball in order to form an averaged pressure.

In the case of the apparatus described in the literature cited above, the last-described kind of measurement data processing was performed. 20 and 10 were selected as values for N and Z. The number of revolutions of the ball during one period of rotation $\tau$ was usually 400. Under these conditions the pressure could be determined with a low error. However, the measurement times were still relatively long.

The present invention is addressed to the problem of creating a process of the kind mentioned above, in which it will be assured that a measurement will be performed with minimal uncertainty in a predetermined measurement time, or in which a pressure can be determined with a given uncertainty in an optimally brief measurement time.

This problem is solved in accordance with the invention, in a measuring process of the kind described above, by the fact that N is to Z as 3:1, 4:1 or 5:1, preferably 4:1. This invention is based on my teaching in this specification that the curve which represents the uncertainty of measurement, in accordance with N/N+Z, is at a minimum when N is to Z as 4 is to 1. The application of this teaching gives the advantage, in comparison to the state of the art, that, within set times of measurement, pressure determinations are possible with substantially lower uncertainty, or, vice versa, pressure determinations with a predetermined margin of error can be performed substantially more quickly.

These advantages can be achieved especially if the value of the period $\tau$ is made to be as small as possible. $\tau$ can be, for example, the time required for a few rotations or only one revolution of the ball. The possibility also exists, however, of selecting a still lower value of $\tau$, for example as the time for one-half or one-quarter of a revolution of the ball. In this case a corresponding number of pickup coils must be associated with the ball.

For a better understanding of the present invention, together with other and further objects thereof, reference is made to the following description, taken in connection with the accompanying drawings, and its scope will be pointed out in the appended claims.

In accordance with the invention, a method for measurement value processing in a gas friction vacuum meter, in which the pressure value is determined by the drag on a magnetically suspended free ball, comprises forming a first time value $t_{n-1}$ by measuring the time of N/2 periods of revolution of the ball and a second time value by directly following measurement of the time $t_n$ of additional N/2 periods of revolution of the ball. The method includes comparing the two time values to determine a pressure value, repeating this pressure value determination from two time values after each period of revolution for the same number of N periods of rotation of the ball to a total of Z determinations. The method also includes displaying the average of the Z- times-determined value, N:Z being as at least one of 3:1, 4:1 and 5:1.

Also in accordance with the invention apparatus for performing a method for measurement value processing in a gas friction vacuum meter, in which the pressure value is determined by the drag on a magnetically suspended free ball, comprising forming a first time value $t_{n-1}$ by measuring the time of N/2 periods of revolution of the ball and a second time value by directly following measurement of the time $t_n$ of additional N/2 periods of revolution of the ball, comparing the two time values to determine a pressure value, repeating this pressure value determination from two time values after each period of revolution for the same number of N periods of rotation of the ball to a total of Z determinations, and displaying the average of the Z-times-determined pressure value, N:Z being as at least one of 3:1, 4:1 and 5:1, the apparatus comprises a magnetically suspended rotating ball, a pickup coil associated with the ball, circuit means for processing the signal induced in the pickup coil, including a computer, and measuring time preselector circuit means being coupled to the computer.

Referring now to the drawings:

FIG. 1 is a schematic drawing of apparatus constructed in accordance with the invention for performing the method in accordance with the invention; and FIG. 2 is a graph representing uncertainty of measurement $\Delta p$ [mbar] as the ordinate vs. total time of measurement $t_m$ (seconds) as the abscissa.

FIG. 1 is a schematic representation showing how the signals are obtained and processed in a gas friction vacuum meter. The ball 1, which is set in rotation about the axis 2 by a driving means not shown, produces, after the drive is shut off, one or more signals in the pickup coil 3 which are delivered to the signal processor 4. In a manner known in itself, the signals are then fed to a trigger circuit 5 and a counter 6 which is controlled by a timing generator 7. The results of the counting are fed by the counting circuit 6 to the computer 8 synchronized by the trigger circuit 5. The display 9 is provided for reading the results produced by the computer 8.

The method of data processing in accordance with the invention can be performed, for example, as follows: In a manner known in itself, the signal processing is performed by the circuits 5, 6 and 7 such that the counter 6 will count the periods in the units set by the timing generator.

Accordingly, the value prescribed by the invention, preferably (N:Z =4:1), is to be entered into the computer 8. This is to be based on the above-mentioned formula for the total time of measurement:

$$T_m = N \times \tau + (Z-N) \times \tau.$$

If M is the sum of N+Z, then (for $t_m >> \tau$)

$$M = \frac{t_m}{\tau}$$

or, $$N = \frac{4}{5} M = \frac{4}{5} \frac{t_m}{\tau}$$

$$Z = \frac{1}{5} M = \frac{1}{5} \frac{t_m}{\tau}$$

Then only the time of measurement itself needs to be put into the computer 8, and this is done by means of the measurement time preselector circuit 11 associated with the computer 8 and represented in FIG. 1. All of the pressure measurements performed with such a setting will then be made with an optimum accuracy of measurement.

According to a further proposal of the invention, the period duration $\tau$ is to be as small as possible. If there is only one pickup coil 3, $\tau$ is preferably selected as the time required for one revolution of the ball. $\tau$ can be made smaller if a plurality of pickup coils are present. An additional pickup coil is represented in broken lines at 12 in FIG. 1. Two pickup coils situated opposite one another, for example, make it possible to make $\tau$ equal the time for half of a revolution of the ball.

FIG. 2 represents by means of a graph the advantages achieved by the invention. The uncertainty of measurement $\Delta p$ is plotted against the total time of measurement $t_m$. The broken curve 13 corresponds to the uncertainty which has to be accepted in the signal processing process of the state of the art described in the beginning. The solid line 14 represents the uncertainty of measurement which can be achieved by the method of the invention, in the case of a $\tau$ corresponding to one revolution of the ball. A further improvement in the uncertainty of measurement can be achieved by selecting a still lower $\tau$. The dash-dotted line 15 shows the uncertainty of measurement when the time measurements are based on half-revolutions of the ball.

The values given relate to a steel ball of 4.5 mm diameter, nitrogen as the measurement gas, and an uncertainty of primary time measurement of $\Delta t = 3$ $\mu$s, that is, the uncertainty of the measurement of one period $\tau$.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A method for measurement value processing in a gas friction vacuum meter, in which the pressure value is determined by the drag on a magnetically suspended free ball, comprising:

forming a first time value $t_{n-1}$ by measuring the time of N/2 periods of revolution of the ball and a second time value by directly following measurement of the time $t_n$ of additional N/2 periods of revolution of the ball, comparing the two time values to determine a pressure value, repeating this pressure value determination from two time values after each period of revolution for the same number of N periods of rotation of the ball to a total of Z determinations, and displaying the average of the Z-times-determined pressure value, N:Z being as at least one of 3:1, 4:1 and 5:1.

2. A method in accordance with claim 1, in which N:Z is as 4:1.

3. A method in accordance with claim 1, in which the value for the duration of the period of revolution is selected small and corresponds to the time for one revolution of the ball.

4. A method in accordance with claim 1, in which the value for the duration of the period of revolution is selected small and corresponds to the time for a fraction of one revolution of the ball.

5. Apparatus for performing a method for measurement value processing in a gas friction vacuum meter, in which the pressure value is determined by the drag on a magnetically suspended free ball, comprising forming a first time value $t_{n-1}$ by measuring the time of N/2 periods of revolution of the ball and a second time value by directly following measurement of the time $t_n$ of additional N/2 periods of revolution of the ball, comparing the two time values to determine a pressure value, repeating this pressure value determination from two time values after each period of revolution for the same number of N periods of rotation of the ball to a total of Z determinations, and displaying the average of the Z-times-determined pressure value N:Z, being as at least one of 3:1, 4:1 and 5:1, the apparatus comprising:

a magnetically suspended, rotating ball, a pickup coil associated with the ball, and circuit means for processing the signal induced in the pickup coil, including a computer, and measuring time preselector circuit means coupled to the computer.

6. Apparatus in accordance with claim 5, comprising at least one additional pickup coil associated with the ball.

* * * * *